US005548717A

United States Patent [19]
Wooldridge et al.

[11] Patent Number: 5,548,717
[45] Date of Patent: Aug. 20, 1996

[54] SOFTWARE DEBUGGING SYSTEM AND METHOD ESPECIALLY ADAPTED FOR CODE DEBUGGING WITHIN A MULTI-ARCHITECTURE ENVIRONMENT

[75] Inventors: James A. Wooldridge, Amherst; Ronald F. Brender; Henry N. Grieb, III, both of Hollis, all of N.H.

[73] Assignee: Digital Equipment Corporation, Maynard, Mass.

[21] Appl. No.: 389,089

[22] Filed: Feb. 14, 1995

Related U.S. Application Data

[63] Continuation of Ser. No. 665,888, Mar. 7, 1991, abandoned.
[51] Int. Cl.⁶ ........................................... G06F 11/00
[52] U.S. Cl. ................... 395/183.14; 395/650; 395/700; 395/500
[58] Field of Search ................... 371/19; 364/267.91; 395/575, 500, 800, 183.14, 600, 650, 700

[56] References Cited

U.S. PATENT DOCUMENTS

| | | | |
|---|---|---|---|
| 3,997,895 | 12/1976 | Cassonnet et al. | 340/172.5 |
| 4,077,058 | 2/1978 | Appell et al. | 395/650 |
| 4,084,235 | 4/1978 | Hirtle | 395/500 |
| 4,253,145 | 2/1981 | Goldberg | 364/200 |
| 4,297,743 | 10/1981 | Appell et al. | 395/650 |

(List continued on next page.)

FOREIGN PATENT DOCUMENTS

| | | |
|---|---|---|
| 168034 | 1/1986 | European Pat. Off. . |
| 0261247 | 3/1988 | European Pat. Off. . |
| 358620 | 3/1990 | European Pat. Off. . |
| 0372835 | 6/1990 | European Pat. Off. . |
| 387172 | 9/1990 | European Pat. Off. . |
| 0411584A2 | 2/1991 | European Pat. Off. . |
| 6273333 | 4/1987 | Japan . |
| 9001738 | 2/1990 | WIPO . |

OTHER PUBLICATIONS

Weiss, Ray, "Sun Simulator Bows (Sun Microsystems Inc's SPARCsim Hardware Simulator)," Electronic Engineering Times, Nov. 7, 1988, summary.

Collett, Ron, "RISC Chips Gain Needed Support Tools," ESD: The Electronic System Design Magazine, Mar. 1989, vol. 19, No. 3, summary.

Kopetzky, D. J., "Horse: A Simulation Of The Horizon Supercomputer," IEEE Comput. Soc. Press, Nov. 1988, pp. 53–54.

Markowitz, Michael, "Software–Modeling Capability Allows You To 'Emulate' Your Systems Designs (Smart-Model Windows, from Logic Automation Inc.) (Product Update)," EDN, Apr. 13, 1989, vol. 34, No. 8, summary.

(List continued on next page.)

*Primary Examiner*—Robert W. Beausoliel, Jr.
*Assistant Examiner*—Ly V. Hua
*Attorney, Agent, or Firm*—Denis G. Maloney; Arthur W. Fisher

[57] ABSTRACT

In a computer system that embodies a first hardware (X) architecture and includes a memory system and at least one simulator for a second (Y) architecture and a system for executing and debugging multiple codes having an environment manager that handles cross-domain calls, a debugging system and method are provided for debugging code in each domain as part of said multi-code executing and debugging system in a multi-architecture environment. In response to calls for debugging from either the X domain or the Y domain, commands are generated for controlling operations in both domains. User generated RUN and STEP commands control the machine execution state in the domain where debugging is performed. General support commands and debug operations support commands including EXAMINE, DEPOSIT, SET BREAKPOINT and CANCEL BREAKPOINT commands which are implemented differently for the different domains may also be user generated for controlling debugging.

33 Claims, 8 Drawing Sheets

U.S. PATENT DOCUMENTS

| | | | |
|---|---|---|---|
| 4,347,565 | 8/1982 | Kaneda et al. | 364/200 |
| 4,454,580 | 6/1984 | Page et al. | 364/200 |
| 4,456,954 | 6/1984 | Bullions, III et al. | 364/200 |
| 4,486,831 | 12/1984 | Wheatley et al. | 364/200 |
| 4,509,122 | 4/1985 | Agnew et al. | 364/200 |
| 4,533,996 | 8/1985 | Hartung et al. | 364/200 |
| 4,630,231 | 12/1986 | Hirata et al. | 364/900 |
| 4,672,532 | 6/1987 | Jonge Vos | 364/200 |
| 4,755,997 | 7/1988 | Takahashi | 371/19 |
| 4,792,895 | 12/1988 | Tallman | 364/200 |
| 4,794,522 | 12/1988 | Simpson | 364/200 |
| 4,802,165 | 1/1989 | Ream | 371/19 |
| 4,811,345 | 3/1989 | Johnson | 395/325 |
| 4,819,234 | 4/1989 | Huber | 371/19 |
| 4,825,354 | 4/1989 | Agrawal et al. | 364/200 |
| 4,839,797 | 6/1989 | Katori et al. | 364/200 |
| 4,841,476 | 6/1989 | Mitchell et al. | 364/900 |
| 4,918,594 | 4/1990 | Onizuka | 364/200 |
| 4,945,480 | 7/1990 | Clark et al. | 364/200 |
| 4,951,195 | 8/1990 | Fogg, Jr. et al. | 364/200 |
| 4,992,934 | 2/1991 | Portanova et al. | 364/200 |
| 5,029,069 | 7/1991 | Sakamura | 395/375 |
| 5,038,348 | 8/1991 | Yoda et al. | 371/19 |
| 5,051,893 | 9/1991 | Tenny et al. | 364/200 |
| 5,063,499 | 11/1991 | Garber | 395/500 |
| 5,067,072 | 11/1991 | Talati et al. | 395/500 |
| 5,093,917 | 3/1992 | Campbell et al. | 395/700 |
| 5,133,072 | 7/1992 | Buzbee | 395/700 |
| 5,142,622 | 8/1992 | Owens | 395/200 |
| 5,146,593 | 9/1992 | Brandle et al. | 395/700 |
| 5,167,023 | 11/1992 | de Nicolas et al. | 395/500 |
| 5,210,832 | 5/1993 | Maier et al. | 395/375 |
| 5,210,874 | 5/1993 | Karger | 395/650 |
| 5,210,876 | 5/1993 | Uchida | 395/700 |
| 5,218,699 | 6/1993 | Brandle et al. | 395/650 |
| 5,307,504 | 4/1994 | Robinson et al. | 395/800 |
| 5,339,422 | 8/1994 | Brender et al. | 395/700 |

OTHER PUBLICATIONS

Cocking, R. C., et al, "Software Device Simulator," IBM Technical Disclosure Bulletin, vol. 15, No. 9, Feb. 1973, pp. 2794–2795.

Wilkinson, B., "Inside Atari DOS," Compute! Books, A Division of Small Systems Services, Inc., Greensboro, North Carolina, Feb. 1982, pp. i–viii.

PC Magazine Programmer's Technical Reference: The Processor and Coprocessor, Robert L. Hummel, pp. 61–64.

Electronics & Wireless World, vol. 96, No. 1655, Sep. 1990, Sutton GB, pp. 801–804; John Mosely: 'Simulation on a Budget Avsim51', see p. 801, right column, line 33—p. 802, left column, line 17.

Microprocessing and Microprogramming, vol. 24, No. 1–5, 1 Sep. 1988, Amsterdam pp. 149–152; Erik Dirkx, et al.: 'An Animated Simulation Environment for Microprocessors', see p. 151, left column, line 1—right column, paragraph 20; figure 2.

May, C., "Mimic: A Fast System/370 Simulator," Sigplan Notices, vol. 22, No. 7, Jul. 1987, pp. 1–13.

Holt, Wayne E., "Beyond RISC!—An Essential Guide To Hewlett–Packard Precision Architecture," Ed., 1988, pp. 225–238.

Tanner, Eve M., "Providing Programmers With A Driver Debug Technique," Hewlett–Packard Journal, Oct. 1989, pp. 76–80.

Banning, "The XDOS Binary Code Conversion System," Compcon 89, Sep. 27, 1989, San Francisco, CA, pp. 282–287.

Hunter and Banning, "DOS at RISC," Byte, vol. 14, No. 12, Nov. 1898, St. Peterborough, US, pp. 361–368.

Gaines, "On The Translation Of Machine Language Programs," Communication of the Association for Computing Machinery, vol, 8, No. 12, Dec. 1965, New York, NY, pp. 736–741.

Bergh, et al, "HP 3000 Emulation on HP Precision Architecture Computers," Hewlett–Packard Journal, Dec. 1987, pp. 87–89.

Turbo Pascal Owners Handbook, Chapter 9, 1987, pp. 125–142.

Tanenbaum, Andrew S., "Structured Computer Organization," Prentice–Hall, 1984, pp. 327–331 and 380–381.

Wright, M., "uP Simulators Let You Debug Software On An IBM PC," Electronic Design News, vol. 31, No. 35, Dec. 11, 1986, pp. 196–204.

Yourdon, Edward, "Techniques of Program Structure and Design," 1975, pp. 54–74 and 93–100.

Dennis, Jack B., "Modularity", Software Engineering, An Advanced Course, F. L. Bauer, Editor, 1977, pp. 128–137.

Aron, Joel D., "The Program Development Process," 1974, pp. 96–100.

Ulrickson, Robert W., "Solve Software Problems Step by Step," Microprocessor Software Design, Max J. Schindler, Editor, 1980, pp. 26–35.

Patch, Kimberly, "Simulator Eases Program Design of 80386 On VAX," Digital Review, vol. 6, No. 35, Sep. 4, 1989, p. 27.

SOFTWARE DEBUGGING SYSTEM AND METHOD ESPECIALLY ADAPTED FOR CODE DEBUGGING WITHIN A MULTI-ARCHITECTURE ENVIRONMENT

This application is a continuation of application Ser. No. 07/665,888, filed Mar. 7, 1991, now abandoned.

CROSS REFERENCE TO RELATED APPLICATIONS

Reference is made to the following concurrently filed patent applications assigned to the present assignee and hereby incorporated by reference:

Ser. No. 07/666,039, filed Mar. 7, 1991 entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/666,028, filed Mar. 7, 1991 entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/666,022, filed Mar. 7, 1991 entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072, filed Mar. 7, 1991 entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752, filed Mar. 7, 1991 entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Ser. No. 07/665,886, filed Mar. 7, 1991 which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

Reference is also made to the following concurrently filed patent applications assigned to the present assignee:

Ser. No. 07/666,071, filed Mar. 7, 1991 entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Ser. No. 07/666,025, filed Mar. 7, 1991 which is hereby incorporated by reference and which is entitled IMPROVED SYSTEM AND METHOD FOR PRESERVING INSTRUCTION GRANULARITY FOR TRANSLATED PROGRAM CODE and filed by Scott G. Robinson and Richard Sites.

BACKGROUND OF THE INVENTION

The present invention relates to methods and systems for debugging software and more particularly to debugging methods and systems especially adapted for code debugging in a system that executes multiple codes within a multi-architecture environment.

A software debugger is a mechanism that is generally employed to detect and correct malfunctions in a newly developed program or a modified existing program that is being tested for proper execution. Conventional debuggers permit a user to execute the program in single steps or to set stops or breakpoints. Stops or breakpoints are points in a program at which the program is to be stopped for user interaction for examination or modification of the memory content or of program state information.

If the software to be debugged is designed for use on a new hardware architecture that is not available for program execution, a software simulator may be employed for execution of some kinds of software on an available computer having a different architecture. Program debugging may then be provided by using simulated architecture comprising the software simulator used on an available architecture.

However, user or other higher level software normally has external run-time dependencies that make using a conventional simulator and debugger to execute and debug such software on the native architecture impractical or impossible. For example, run-time libraries and the operating system itself may not be available for the new architecture. A new program that makes library and operating system calls will not be executable by the simulator being used for debugging in the native architecture unless extensive modifications are made in the new program to remove the unavailable external dependencies.

A need has thus existed for executing, testing and debugging new software designed for a new hardware architecture even though the actual new hardware, a new operating system therefor and/or support software are not available. A new system and method disclosed in the cross-referenced patent application Ser. No. 07/666,039, filed Mar. 7, 1991 and other cross-referenced applications are directed to meeting this and related needs through the execution of multiple codes in a multiple architecture environment. A new callable simulator employable in the new multi-architecture system is disclosed in the cross-referenced application Ser. No. 07/666,022, filed Mar. 7, 1991.

From the standpoint of debugging in a multi-architecture environment, the user needs to be able to interact with program code in either architecture even though the codes make use of different features of the two architectures. A multiple architecture debugger thus requires simultaneous access to the multiple architectures.

The present invention is directed to a new and improved debugger system and method that can be employed to debug a program code with simultaneous access to multiple architectures in a multi-code execution system within a multi-architecture environment.

SUMMARY OF THE INVENTION

In a multi-architecture computer system that embodies a first hardware X architecture providing an X operating domain, a memory system, at least one simulator for simulating a second Y architecture providing a Y operating domain, a system and method are provided for executing and debugging multiple codes in the multi-architecture environment. Cross-domain calls for debugger operation from either the X domain or the Y domain are received and detected. In response to these calls, debugging commands are generated for application to the domain where debugging operations are to be performed.

BRIEF DESCRIPTION OF THE DRAWINGS

The accompanying drawings, which are incorporated in and constitute a part of this specification, illustrate one embodiment of the invention and, together with the description, provide an explanation of the objects, advantages and principles of the invention. In the drawings.

DESCRIPTION OF THE PREFERRED EMBODIMENT

Figure 1:
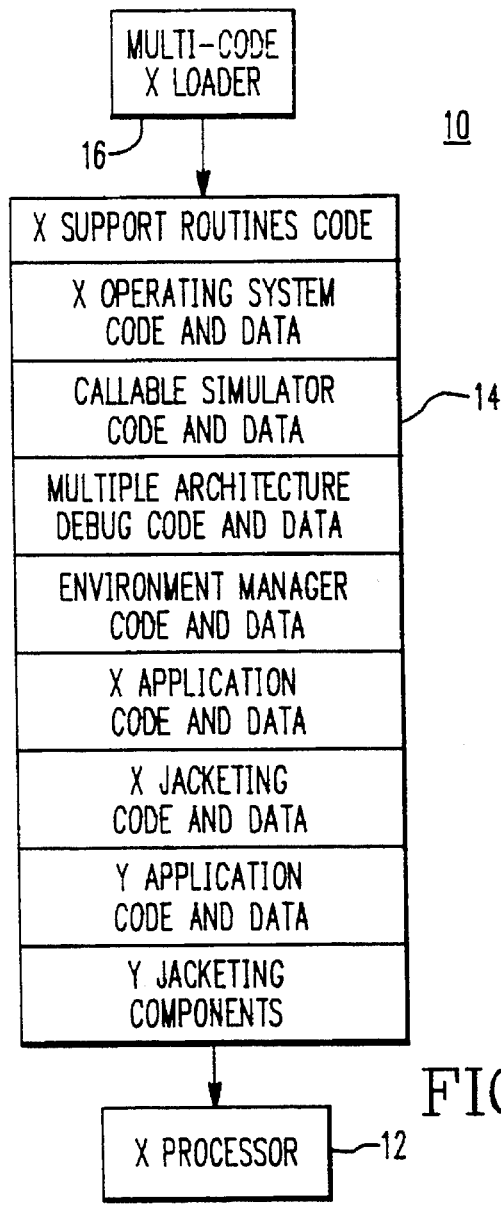
FIG. 1 shows a functional block diagram of a system for executing and debugging multiple codes in a multi-architecture environment.

More particularly, there is shown in FIG. 1 a system 10 that is arranged to execute and debug multiple codes in a multi-architecture environment. An X processor 12 forms a part of a real X architecture that provides for the execution of multiple codes including X code. The X code includes programmed instructions designed to operate in the X architecture.

Generally, the system 10 can be operated to process and execute multiple codes, but in the preferred embodiment, the system 10 is structured for executing two codes, the X code and another code designated as Y code. The Y code includes programmed instructions designed to execute on a machine whose architecture is being simulated by the X processor 12. In the preferred embodiment, the system 10 may directly execute a new user level or other level program compiled in or translated to the Y code, and in doing so, make use of X operating system and support software.

As an example of a commercial application of the system 10 for translated X program code, the X code may be a complex instruction set code (CISC) for which a hardware implementation exists, and the Y code may be a reduced instruction set code (RISC) for which no real RISC hardware exists. A possible CISC system is the VAX® computer system manufactured by the assignee of the present application. Reference is made to the cross-referenced Ser. Nos. 07/665,886, filed Mar. 7, 1991, 07/666,025, filed Mar. 7, 1991, 07/666,039, filed Mar. 7, 1991, 07/666,028, filed Mar. 7, 1991, 07/665,888, filed Mar. 7, 1991, 07/666,022, filed Mar. 7, 1991, 07/666,072, filed Mar. 7, 1991, 07/665,752, filed Mar. 7, 1991, and 07/665,886, filed Mar. 7, 1991 which are related to CISC-to-RISC translation systems.

The system 10 further includes a memory system 14 having a general layout for program and data components as shown in FIG. 1. An X loader 16 provides for program code entry into the memory system 14 as more fully described in the cross-referenced application Ser. No. 07/666,039, filed Mar. 7, 1991.

Figure 2:
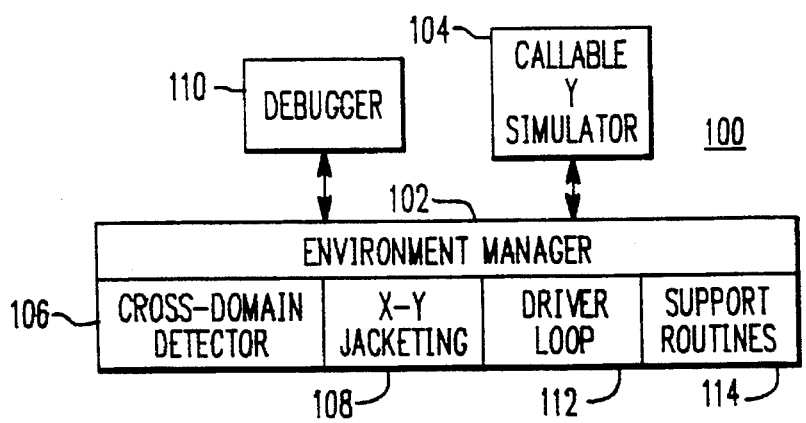
FIG. 2 shows a more detailed functional block diagram of a software system employed in the system of FIG. 1 and including a debugger arranged in accordance with the present invention.

FIG. 2 shows the architecture of a software system 100 which can be executed by the system 10. A callable simulator 104 functions as part of software system 100 (FIG. 2) within a second architecture (domain), which is preferably a Y architecture embodied in the X hardware. The simulator 104 is structured to emulate Y hardware on the X hardware that may be under development and unavailable. Generally, the simulator 104, when called from X code through environment manger 102, executes Y instructions. Calls may also be made from the Y code through the environment manager 102 for X code execution. For example, the Y code may represent a user level application program and may call for execution of a routine that is located in an X library or it may make a call requiring operating system processing in the X domain. For a detailed description of the structure and operation of the simulator 104, reference is made to the cross-referenced application Ser. No. 07/666,022, filed Mar. 7, 1991.

A debugging capability need not be included in the system 10 where system operation is limited to multi-code execution. However, debugging is provided where the system 10 is to be used for code testing.

A debugger system 110 provides for debugging operations within the Y domain under control of the environment manager 102. In its total operation, the debugger system 110 provides the user with control over the execution of code in either domain so that the whole execution process may be examined and modified to correct malfunctions. Generally, the debugger system provides the procedures needed for debugging operations such as setting breakpoints in both the X and Y domains. The debugger 110 is structured for interaction with the callable simulator 104 within the system 100.

A cross-domain detector system 106 is employed by the environment manager 102 to determine when a cross-domain call is made during the execution of either the X code or the Y code. An X-Y jacketing system 108 operates within the environment manager system 102 to provide the X and Y executable instruction interfacing needed to implement cross-domain calls between routines. Reference is made to Ser. Nos. 07/666,072, filed Mar. 7, 1991, and 07/665,752, filed Mar. 7, 1991 for more detailed disclosure of the detector and jacketing systems 106 and 108.

The environment manager 102 exercises supervisory control over the callable simulator 104 and the debugger 110 through the execution of a driver loop 112. Support routines 114 provide various services, especially on request from the debugger 110.

With use of the code translation system and method disclosed in the cross-referenced application Ser. Nos.

07/666,071, filed Mar. 7, 1991, and 07/666,025, filed Mar. 7, 1991, CISC user level and other X programs can be translated to functionally equivalent RISC Y programs which can be executed on real CISC X hardware by the system 10 for testing and debugging purposes even though operable RISC Y hardware is unavailable.

Advantageously, an X program can be partly translated to Y program code, or a new program can be partly written in Y code for execution with supporting or other X program code, and the mixed X-Y program code can be executed by the system 10 for testing and debugging of both the X and Y codes. The Y code is executed, tested and debugged on the simulated architecture and the remaining X code is executed, tested and debugged on the native architecture. With successful testing of the existing Y code, additional segments of X code can be translated for stepped Y code testing and debugging until the X code is fully translated and the Y code testing and debugging is completed. With the use of progressively stepped testing and debugging, the entire testing and debugging process is facilitated.

Overall, a program can be executed and tested for use in the Y architecture by translating or compiling the program into Y code and running the Y code on the callable system simulator with the run-time environment for the Y code being provided by the operating system and run-time libraries executing on the X or native hardware architecture that is included in the multi-architecture system. The composite software thus includes X and Y codes that are properly executed on the combined X (real) and Y (simulated) architectures. In the preferred embodiment described herein, the operating system for the composite software system is structurally included in the X architecture.

The code boundary between the real and simulated architectures is generally open to the system user's needs. For example, the code boundary can be between the program being ported and the X operating system, or as indicated above it can even be within the program being ported.

The software system 100 generally has application to widely different architectures. The system 100 also has application to architecture-implementation systems that have different operating systems and different calling systems, but such application is facilitated if the architecture-implementation systems have similar operating systems and similar calling standards. Reference is made to the cross-referenced application Ser. No. 07/666,752, filed Mar. 7, 1991 for additional background information on calling systems and differences among them.

DRIVER LOOP

Figure 5:
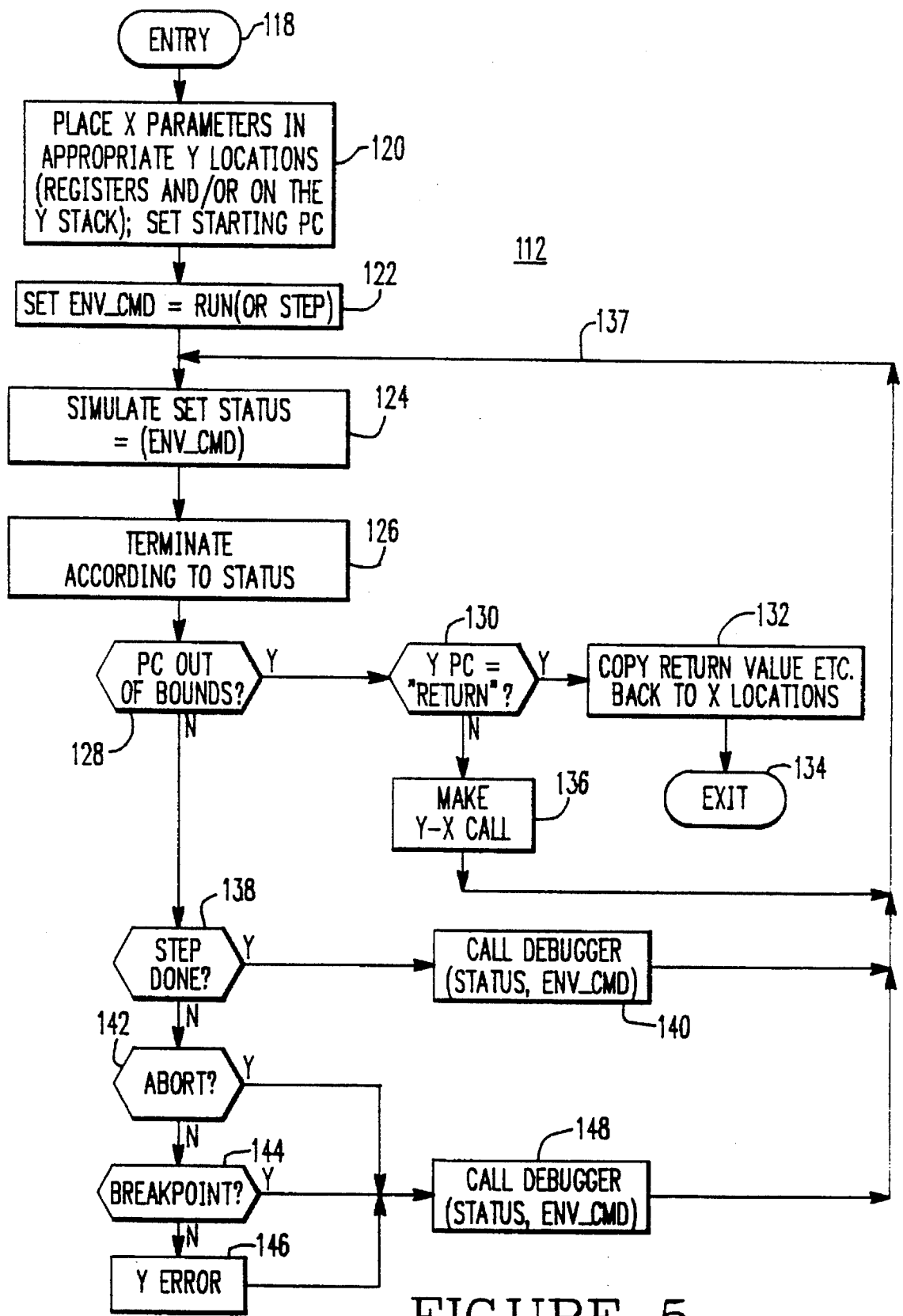
FIG. 5 shows a flow chart for a simulator/debugger driver loop included as a part of an environment manager to provide control and coordination for the debugger of FIG. 3.

In FIG. 5, there is shown a flow chart for the driver loop 112 which drives the simulation/debugging operation. Entry is made to the loop 112 at block 118 when a call is made from X code, often from X application code for execution of a Y routine through the jacketing system 108. Jacketing provides interfacing between the X and Y codes to adjust for calling standard differences.

In block 120, parameters are set up as part of the jacketing process, and in particular X parameters are placed in appropriate Y locations for use during Y code execution. Thus, for normally jacketed routine calls, jacketing tables are referenced in the jacketing system 108 to determine where parameters come from in the X domain and where the corresponding values must be placed in the Y domain. For auto-jacketed routine calls, standard call rules are embedded in special code for this purpose in the jacketing system 108.

More detail on jacketing for domain interface purposes is set forth in the cross-referenced application Ser. No. 07/666,752, filed Mar. 7, 1991.

A special or distinguished return address is placed in the standard return-address register. The distinguished return address is outside the address bounds previously established as containing Y code. It must also be different from an address that might be used to encode a Y-X call.

In functional block 122, a string variable named ENV_CMD is set by default to RUN mode (continuous instruction execution) or it may be set to STEP mode (instruction-by-instruction execution) by a user selection from the debugger 110. For example, the user may decide to perform maintenance on the particular Y routine that has been called by an X code routine, and accordingly may make a STEP MODE selection for the Y domain.

The simulator 104 is called by block 124 to simulate the Y machine in accordance with the selected mode and the current Y machine state. One or more Y instructions are then executed in the Y domain by the X hardware.

Block 126 next provides for driver loop termination and return according to detected conditions returned from the simulator 104 after its operation has terminated. If the Y program counter is determined to be out of bounds previously established as containing Y code and data as indicated by block 126, a test block 130 determines whether the Y program counter is making a return to the caller X program.

If the Y program counter matches the distinguished return address in the block 130, execution of the Y routine has been completed and is making a return to its X caller. Block 132 then provides jacketing services, i.e., it copies values as appropriate from the Y result register(s) to the X domain. Normally jacketed calls are processed with the jacketing tables used to initiate the original call. The previously referenced special jacketing code is used for auto-jacketed calls. Simulation is complete at this point as indicated by exit block 134.

If the test block 130 determines that the Y program counter corresponds to a jacketing table entry and does not match the distinguished return address, a call is being made for execution of an X routine within the current execution process in the Y domain (in the absence of a programming error). Block 136 then provides jacketing services, i.e., it initiates a Y-X call and the jacketing system 108 accesses the jacketing tables to obtain the information needed to copy parameters from the Y-domain to the X domain, the address of the X routine being called, etc. When a return is made to the block 136 from the called X routine, the return value is copied into the Y domain and simulation is resumed as indicated by path 137.

With reference again to block 126, if the STEP mode had been requested and the simulation termination is accordingly determined to be a case called Step Done as indicated by block 138, functional block 140 calls the debugger 110 to indicate completion of the requested step operation and pass the previously returned status and the variable ENV_CMD. A return to the simulator enables resumed simulation without requiring direct simulator recall by the debugger 110.

The debugger 110 interprets the status and may make a report to the user. Additional simulator step operations may be requested by the debugger 110 in accordance with a previously established internal script or by user selection. The driver variable ENV_CMD is set to RUN or STEP according to debugger requests.

The debugger 110 calls the environment manager 102 to perform other inquiry and status control functions (such as set BREAKPOINT). In the present embodiment, simulation is controlled only by the driver 112.

If the simulation termination is due to an abort 142 or a breakpoint 144 or Y errors 146, block 148 calls the debugger 110 and operates in the manner described for the block 140.

DEBUGGER

Figure 3:
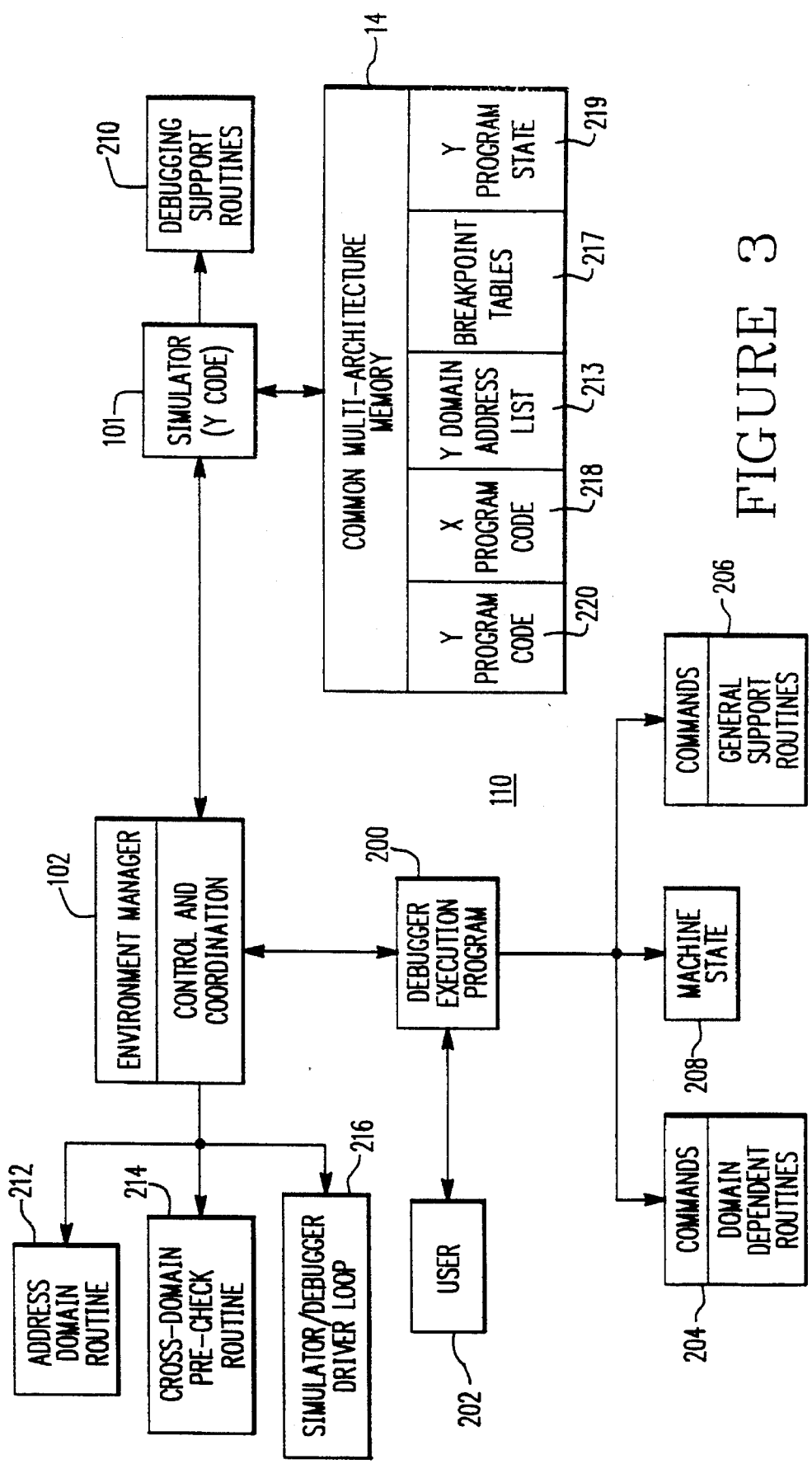
FIG. 3 shows a functional block diagram representing the software and hardware structure of the debugger of FIG. 2 and related system components.

The debugger 110 provides for debugging operations in both the X and the Y domains and is shown in greater detail in FIG. 3. In addition, portions of the common multi-architecture memory 14 most pertinent to debugger operation, and debugger related routines housed in other components of the software system 100 are shown in FIG. 3.

A debugger execution program 200 is structured to be interactive with a user as indicated by block 202. Accordingly, the user is enabled to detect and correct malfunctions in X or Y program code being executed by the multi-code execution and debugging system 10.

Basic debugging functions are commonly provided by the debugger 110 for both the X domain and the Y domain. The procedures and mechanisms by which basic debugging functions are implemented are different for the X and Y domains as subsequently described more fully herein.

To provide for program malfunction detection and correction, the debugger program 200 is further structured to implement commands through domain dependent support or service routines 204 and general support routines 206. As indicated by block 208, the state of the active machine (X or Y) is set either to STEP instructions or to RUN instructions in the code being executed.

Various debugger support routines 210 are housed in the simulator 104 and accessed through the control of the environment manager 102. Thus, address domain routine 212 and a cross-domain pre-check routine 214 are accessed in the environment manager 102 to provide additional support for debugger operation.

Figure 10:
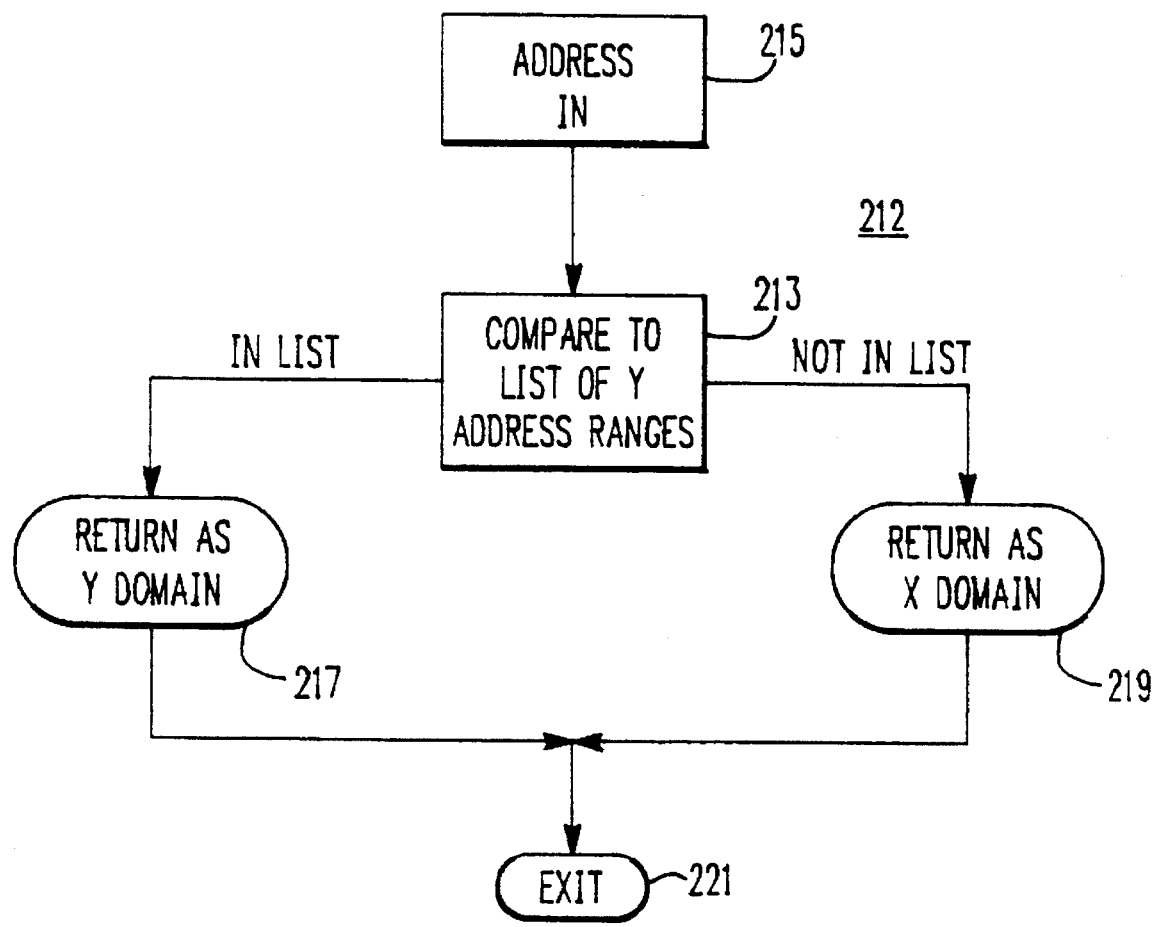
FIG. 10 shows a flow chart for a routine that determines the domain of a memory address on request from another routine.

The address domain routine 212, a flow chart for which is shown in FIG. 10, determines whether an instruction address lies within the Y domain or the X domain as needed for simulator/debugging operations. In the preferred embodiment, the routine 212 (FIG. 10) employs a list 213 of the address ranges that lie within the Y domain. Any requested address 215 in one of the address ranges on the list is returned as Y domain by block 217, and any requested address not on the list is returned as X domain by block 219. The routine 212 exits at block 221. Appropriate list and logic modifications are made where more than two architectures are to be serviced.

The cross-domain pre-check routine 214 (FIG. 3) enables the debugger 200 to determine whether the instruction about to execute (current program counter) will cause a change of code execution domain from X to Y or Y to X.

The simulator/debugger driver loop 112 (FIGS. 2 and 5) is executed by the environment manager 102 to provide basic control over execution of Y code and for invoking the operation of the debugger for Y domain debugging as required. The memory system 14 contains the X and Y program codes 218 and 220 being executed by the native (X) architecture and the simulated (Y) architecture. Other memory contents related to debugger operations includes a Y domain address list 213, the breakpoint tables 217 used by the simulator 104 and by the debugger 110, and the state 219 of the Y architecture program (i.e., register state of the simulated processor).

In the present embodiment of the invention, a program counter is provided for each domain. Specifically, an X program counter and a Y program counter are provided and the X and Y program counters are essentially independent of each other. The X program counter is a register that contains the address of the next instruction as fetched by X hardware from the memory instruction list of the X code. The Y program counter is a register in the X hardware structured to be part of the Y simulator and it similarly contains the next Y instruction as fetched by the simulator from the memory instruction list of the Y code.

DEBUGGER FLOW CHART

Figure 4:
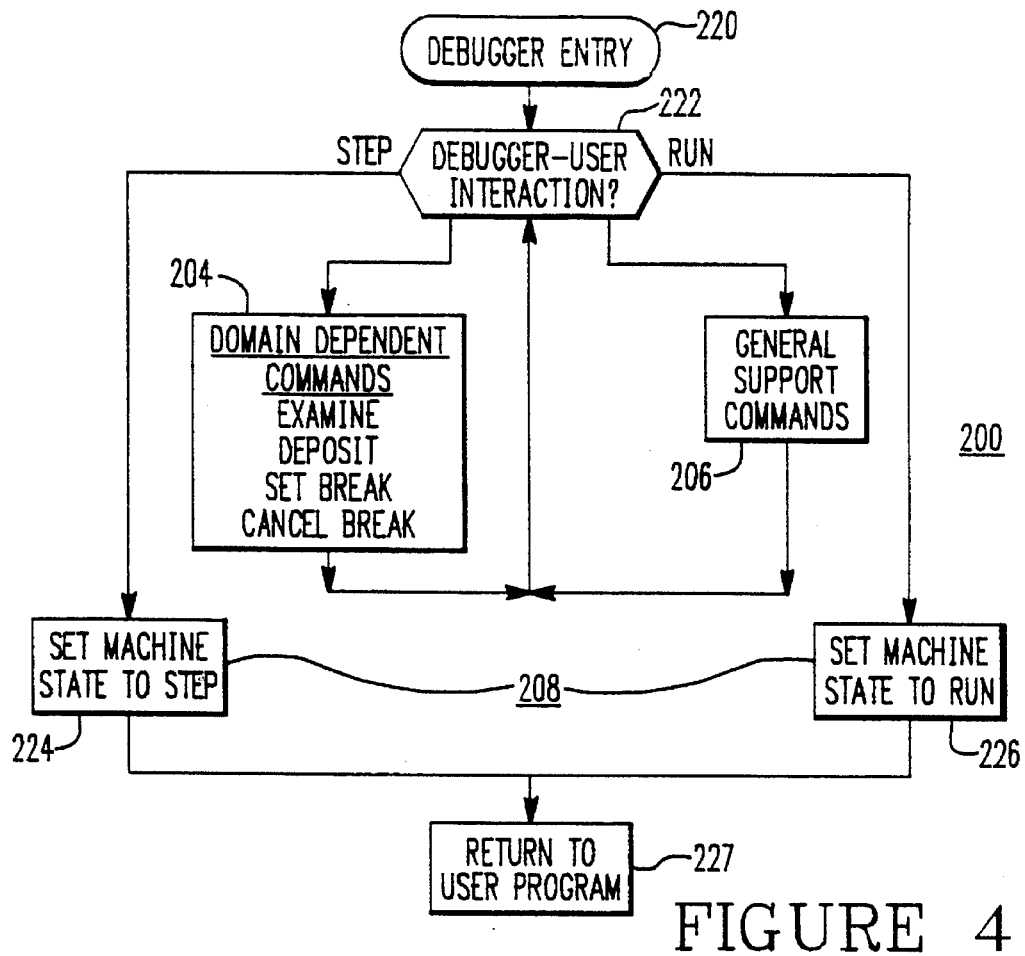
FIG. 4 shows a general flow chart for a debugger program included as part of the debugger in FIG. 3.

The debugger program 200 performs its described functions in accordance with the flow chart shown in FIG. 4. The debugger program 200 is entered at block 220 from the X domain or from the Y domain if the driver loop 112 (FIGS. 2 and 5) in the environment manager 102 finds a Y domain call.

When the debugger 110 is operational, the debugger program 200 accordingly can be entered from X code or Y code. Entry from either X or Y code occurs:

1. when the code execution starts and a debug prompt leads to the performance of initial tasks;
2. when a breakpoint is reached;
3. when a STEP command generated by the debugger is completed;
4. when the X or Y code generates an exception condition; and
5. when the code execution ends. Entry from the X code is made, in the present embodiment, through the standard X hardware and the standard X operating system. Entry from the Y code is made through the driver loop 216 (FIG. 5) in the environment manager 102.

At entry time for Y code debugging, the driver loop 112 (FIG. 2 and designated as 216 in FIG. 3) calls the debugger program 200 and transfers to it the current program state and a command buffer to fill with a command that is to be executed on return from the debugger program 200. The name of the command buffer is ENV_CMD and its purpose is to control the execution state of the simulator 104.

In a user interaction block 222, the current Y program state is reported to the user and a command is requested from the user. Once a support command or an execution state command is entered by the user, the block 222 parses and executes the command.

In the preferred embodiment, each general support command is executed by an associated routine (not specifically shown) in the block 206, and a return is then made to the user interaction block 222. The general support commands are conventional commands that are always executed in the same way regardless of domain. In the present embodiment, such commands include those that:

1. control the appearance of the screen or windows;
2. control the form of displayed information such as changing the default radix for numeric display from decimal to hexadecimal; or
3. provide other functions as set forth in a VMS debugger manual, Order Number AA-LA59A-TE for the VAX®/VMS Operating System published by the present assignee.

Program domain dependent support commands EXAMINE, DEPOSIT, SET BREAK, and CANCEL BREAK are executed by respective routines in the block 204. These routines are described in greater detail subsequently herein. After execution of any domain dependent support command, a return is made to the user interaction block 222.

If the user requests that the machine state be set in the block 222, a STEP command is executed by block 224 with dependence on the current program domain or a RUN command is executed by block 226 with dependence on the current program domain.

After a STEP or RUN command, the debugger program 200 sets up the proper conditions to apply the command to the domain under debugger control and, as indicated by block 227, returns control to the Y user program which then proceeds to execute from the point at which it was interrupted by a call to the debugger 110.

Figure 6:
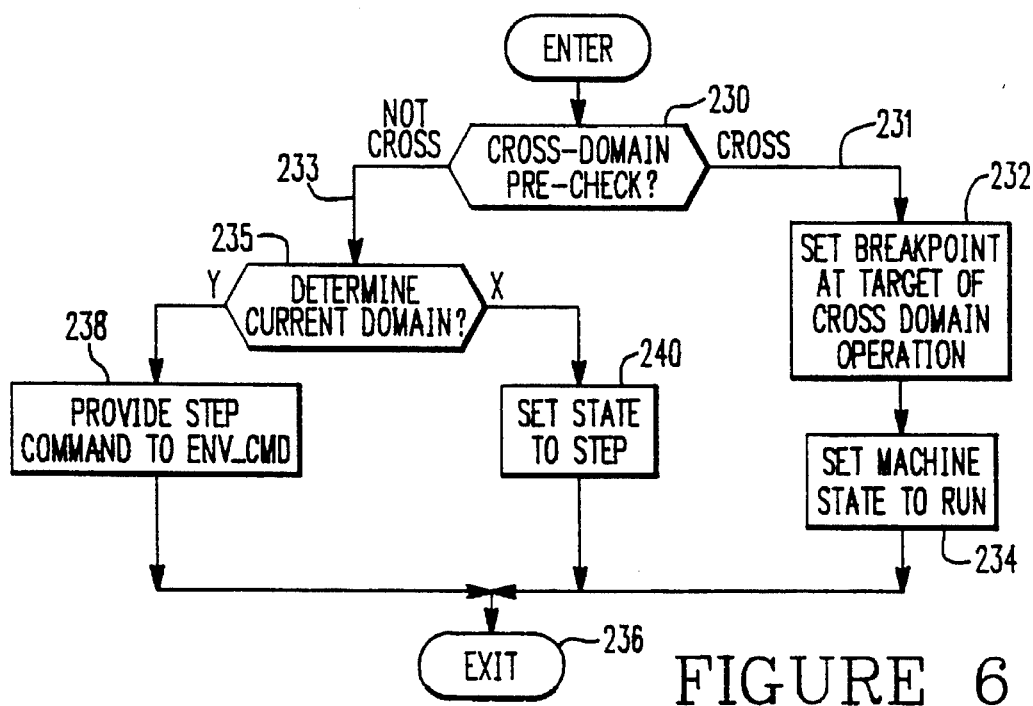
FIG. 6 shows a flow chart for a set machine-state routine executed by the debugger program to set a STEP machine state.

The set machine state to STEP routine of block 224 is shown in greater detail in FIG. 6. Its execution path depends on the domain to which the STEP command is to be applied and operated under debugging control, herein called the "debug domain". Generally, the STEP command causes the debugger 110 to direct that a single instruction be executed in the domain in which code is to be executed and then request a further command from the user through a reentry to the debugger in block 220.

Functional block 230 calls the cross-domain pre-check routine 214 (FIG. 3) for execution. Routine 214 determines whether the current instruction will cause a domain change, i.e., an execution switch from one domain to the other. If so, the address of the first instruction that will be executed in the new domain is also determined.

If a domain change is detected, branch 231 is followed. Block 232 sets a breakpoint at the address of the first instruction that will be executed in the new domain. Next, the machine state is set to RUN by block 234 so that code can be executed until the breakpoint just set is reached. Finally, an exit is made from the branch 231 to the user program, as indicated by the reference character 236.

A jacketing code executes the domain change after an exit from block 224 via the branch 231. This is more fully disclosed in the cross-referenced application Ser. No. 07/665,752, filed Mar. 7, 1991. After the new code execution reaches the breakpoint, the debugger is reentered with an indication that the STEP routine has been completed.

Branch 233 is followed and block 235 becomes operational where no domain crossing is detected by the block 230. Block 235 determines whether the current domain is X or Y since the STEP operation is implemented differently for X and Y domains. The address domain routine 212 (FIG. 3) is called from the environment manager 102 to determine the domain on the basis of the current instruction execution address.

If the domain is determined to be the simulated (Y) domain, block 238 generates a STEP command to ENV_CMD in the buffer received on debugger program entry. In this manner, a command is made to the environment manager 102 to execute a single instruction in the Y domain. In response, the driver loop 216 (FIG. 5) facilitates execution of this command through a STEP routine in the debug support block 210 (FIG. 3) of the Y domain simulator 104. More detail on the STEP support in the simulator 104 is presented in the cross-referenced application Ser. No. 07/666,022, filed Mar. 7, 1991.

If the domain is determined to be the native (X) architecture, block 240 sets the X state to STEP using the standard X hardware for STEP implementation. For example, in the VAX® system, the SINGLE STEP mode is set by a single bit in the processor state longword.

Figure 7:
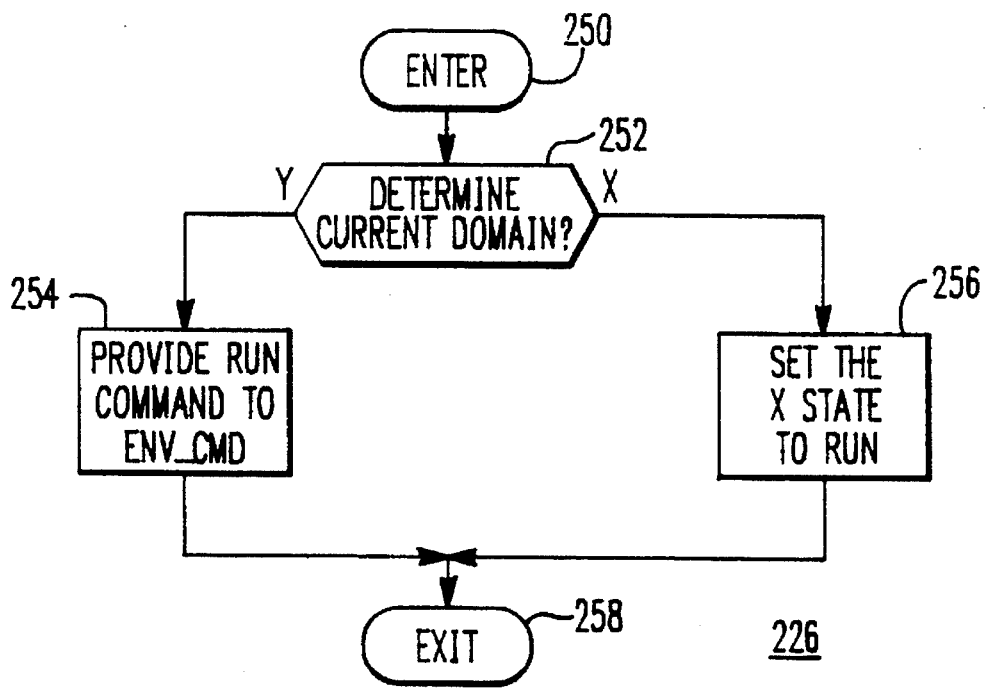
FIG. 7 shows a flow chart for a set machine-state routine executed by the debugger routine to set a RUN machine state.

After execution of the program branch 233 through the block 238 or the block 240, the routine exits at block 236 for a return to the user program through the block 227 (FIG. 4).

Where the machine state is to be set to RUN by the user in FIG. 4 or by programming in FIG. 6, the block 226 executes the routine shown in FIG. 7 and its execution path is also dependent on the domain to which the RUN command is to be applied. After entry in block 250, functional block 252 determines the current domain in the manner described for the block 235 in FIG. 6.

If the Y domain is detected, block 254 places a RUN command in ENV_CMD in the buffer provided by the environment manager 102. The driver loop 216 then applies the command to the simulator 104.

If the X domain is detected, block 256 sets the X state to RUN by a return to X program execution. After execution of block 254 or 256, the routine exits at block 258 to the calling routine.

Routines for selected ones of the domain dependent routines are shown in FIGS. 8A–8D. After entry to each routine, the current domain is first determined by block 270A, 270B, 270C, or 270D, respectively, as described for the block 235 in FIG. 6.

Figure 8A:
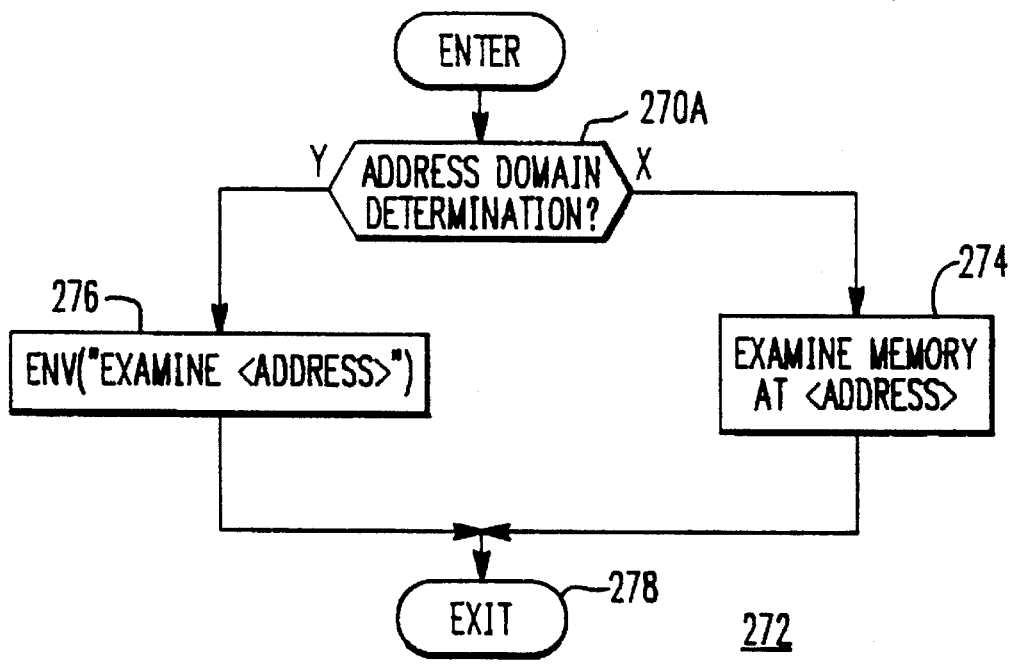
FIGS. 8A–8D show respective flow charts for routines employed by the debugger program to execute domain dependent commands.

A domain dependent routine 272 in FIG. 8A executes an EXAMINE command which enables the user to examine a memory location. If the target memory address lies in the X domain, block 274 directly executes the reading of the X domain location in the common memory through X hardware operations.

If the target address lies in the Y domain, block 276 requests the environment manager 102 to process the EXAMINE command. The environment manager 102 then operates through the simulator 104 to read the Y domain address in the common memory and provide the data to the user.

The EXAMINE routine 272 is ended at exit block 278 and the debugger program 200 then awaits further commands from the user interaction block 222 (FIG. 4).

Figure 8B:
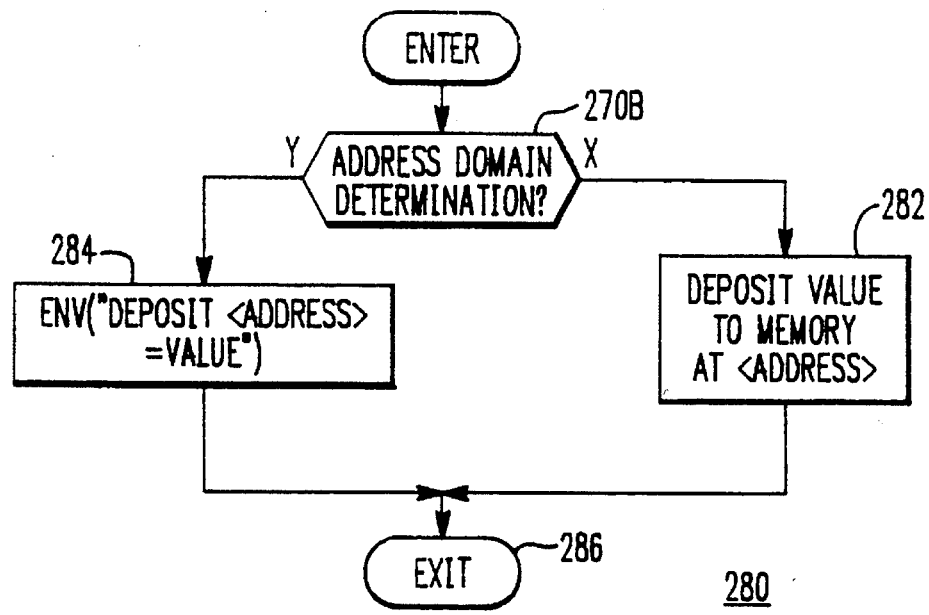

Another domain dependent routine, DEPOSIT routine 280 shown in FIG. 8B, executes a DEPOSIT command which enables the user to write to a memory location. If the target memory address lies in the X domain, block 282 directly writes to the X domain location in the common memory.

If the target memory address lies in the Y domain, block 284 requests the environment manager 102 to process the DEPOSIT command. The environment manager 102 then operates through the simulator 104 to write to the Y domain location in the common memory.

The DEPOSIT routine 280 is ended at exit block 286 and the debugger program 200 awaits further commands from the user interaction block 222 (FIG. 4).

Figure 8C:
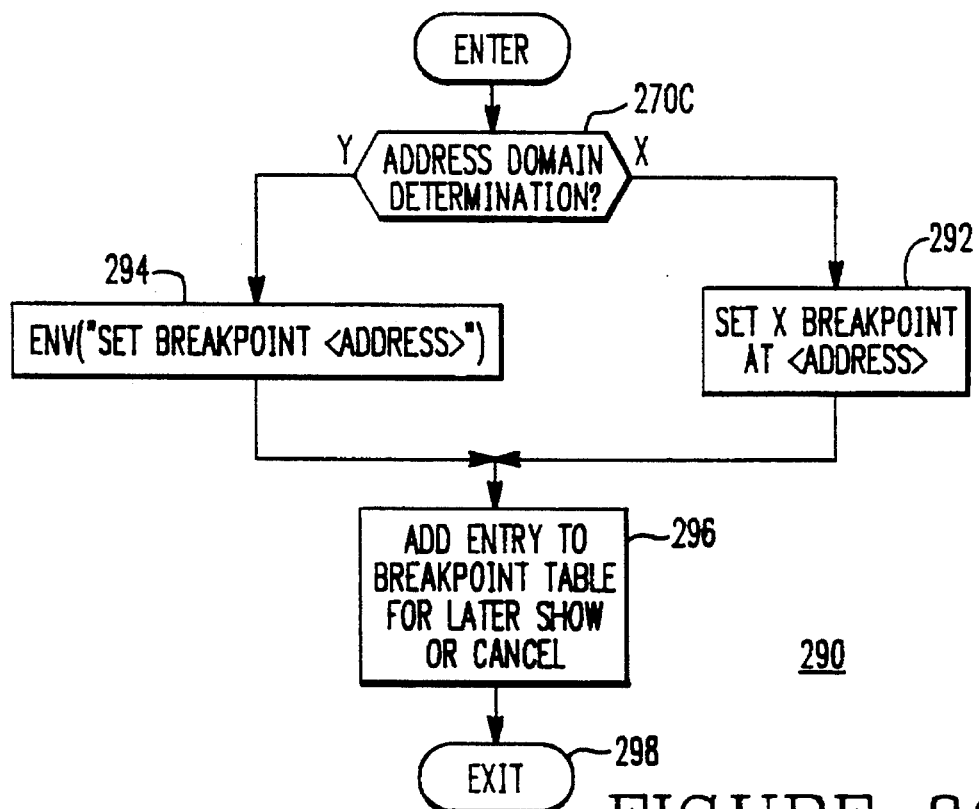
Figure 8D:
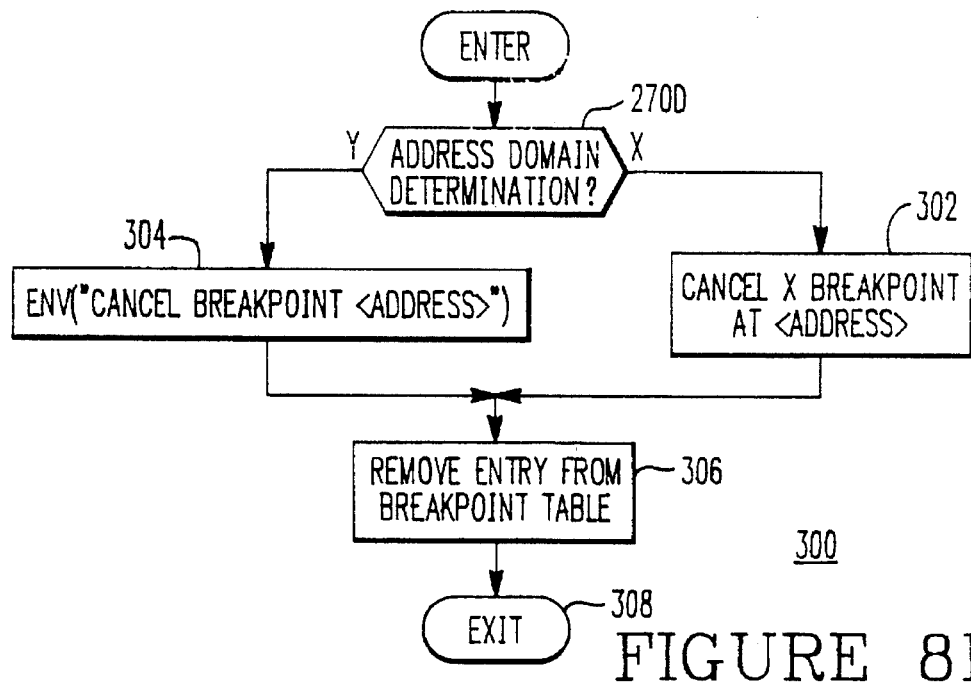

A SET BREAKPOINT routine 290 in FIG. 8C is also domain dependent and executes a SET BREAKPOINT command made by the user through the user interaction block 222 (FIG. 4) or as a result of a domain crossover by the current instruction in the execution of a STEP command by the block 232 (FIG. 6). As previously indicated, a breakpoint needs to be set at the target address of a domain change instruction in implementing a STEP command.

If the target address for the breakpoint lies in the X domain, a functional block 292 writes a breakpoint directly into the X program code. If the address is in the Y domain, a block 294 requests the environment manager 102 to process the command and a breakpoint is then set in the Y program code through operation of the simulator 104.

After the commanded breakpoint has been entered into the program code, block 296 adds the entry to a breakpoint table for later use an appropriate SHOW or CANCEL routine. With use of the breakpoint table, the debugger program 200 can later display the list of breakpoints or delete breakpoints selectively.

The SET BREAKPOINT routine 290 is ended at exit block 298 after table entry and a return is made to the requesting routine.

A CANCEL BREAKPOINT routine 300 (FIG. 8D), which is also domain dependent, executes a CANCEL BREAKPOINT command made by the user in the user interaction block 222 (FIG. 4). This command provides for cancelling a breakpoint previously written by the debugger program 200 at some program code address.

If the target address for the breakpoint lies within the X domain, block 302 deletes the specified breakpoint that it had previously written into the X program code. If the target address lies within the Y domain, block 304 requests the environment manager 102 to process the command and the specified breakpoint is then removed from the Y code through operation of the simulator 104.

After the cancellation operation is completed, block 306 removes the cancelled breakpoint from the breakpoint list. An exit is made from the CANCEL BREAKPOINT routine 300 at block 308 for further user commands.

Figure 9:
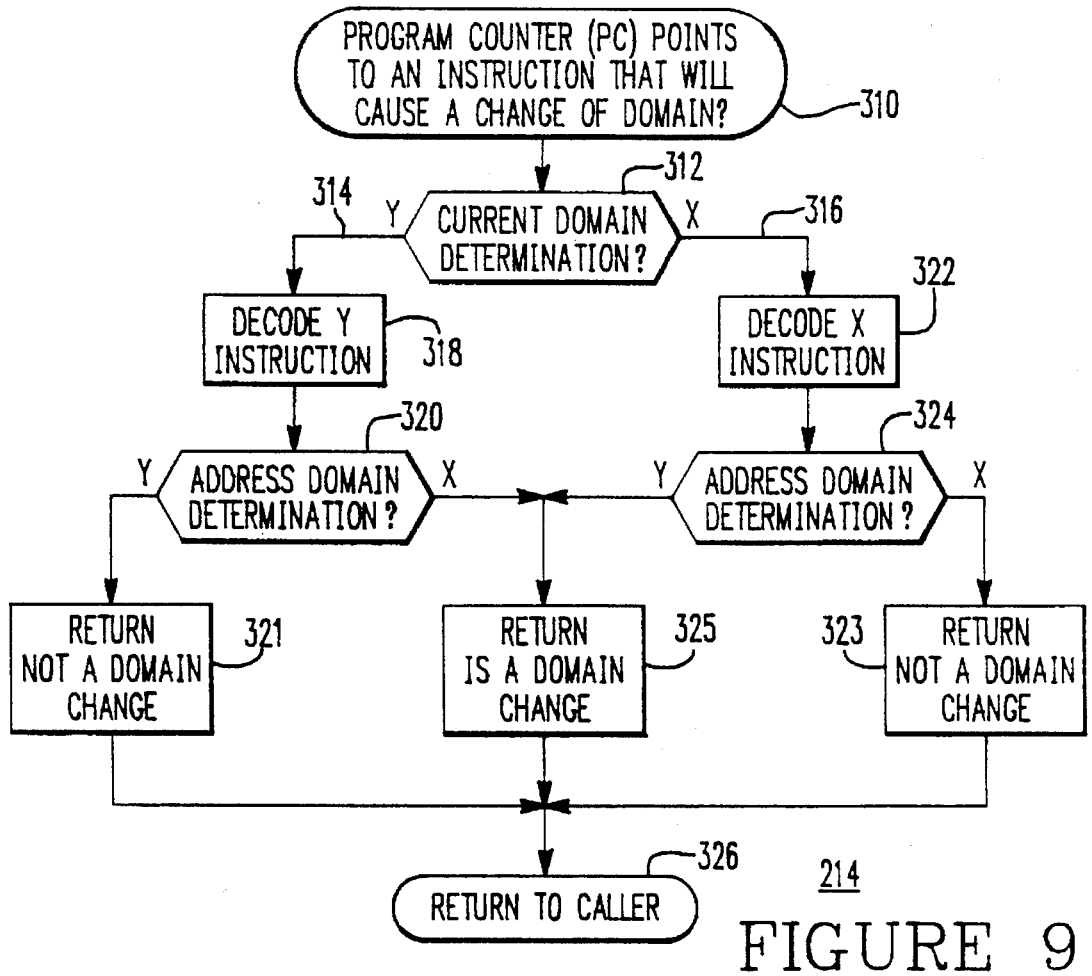
FIG. 9 shows a flow chart for a cross-domain pre-check routine provided by the environment manager in support of the debugger.

In FIG. 9 there is shown a flow chart for the cross-domain pre-check routine 214 (FIG. 3) which is resident in the environment manager 102. The routine 214 is entered to determine whether the instruction will cause a domain change.

A functional block 312 first determines the current domain through operation of the address domain routine 212 (FIG. 10) on the current program counter in a manner like that previously described. Branch 314 is followed if the current domain is the Y domain and branch 316 is followed if the current domain is the X domain.

In the branch 314, the Y instruction is decoded by block 318 to determine the next instruction. The target address of the next instruction is then determined by block 320 through execution of the address domain routine 212 (FIG. 10). If the target address is in the Y domain, block 321 generates an indication for the caller that the instruction will not change the domain. However, if the target address is in the X domain, block 325 generates an indication for the caller that the instruction will change the domain, and further generates the address for the next instruction for a breakpoint entry.

In the branch 316, the X instruction is decoded by block 322 to determine the next instruction. The target address of the next instruction is then determined by block 324 through execution of the address domain routine 212 (FIG. 10). If the target address is in the X domain, block 323 generates an indication for the caller that the instruction will not change the domain. If the target address is in the Y domain, the block 325 generates the domain change indication as previously described.

The cross-domain pre-check routine 214 ends with a return to the caller as indicated by block 326.

various modifications and variations can be made in the improved software debugging system and method especially adapted for code debugging within a multi-architecture environment of the present invention by those skilled in the pertaining art without departing from the scope and spirit of the invention. Modifications and variations of the particular embodiments disclosed herein are possible and are within the scope of the appended claims and their equivalents.

What is claimed is:

1. A computer system including a first X architecture providing an X domain associated with X code for executing and debugging code associated with both said X domain and a Y domain, the system comprising:

means for receiving calls for debugging code in a selected domain, said selected domain being one of said X domain or said Y domain, said calls being received from said X domain and said Y domain;

a simulator which simulates at least one second Y architecture providing said Y domain associated with Y code;

a memory system for storing said X code and said Y code;

means, responsive to the call receiving means, for initiating debugging in said selected domain;

means, responsive to said initiating means, for generating commands, said commands controlling debugging of said code in said X domain and said Y domain; and means, responsive to said command generating means, for performing said commands in said computer system in order to control debugging of said code.

2. The system of claim 1, wherein said generating commands means includes means for generating commands for setting a machine execution sate of the computer system in the selected domain.

3. The system of claim 2, wherein said machine execution state includes a STEP state in which said code being debugged is executed stepwise instruction-by-instruction, and a RUN state in which said code is executed continuously.

4. The system of claim 3, wherein said generating commands means includes:

means for detecting whether a code instruction to be executed will require a cross-domain execution switch from a current domain to a new domain;

means for setting a breakpoint at an address of a first instruction to be executed in the new domain if a cross-domain execution switch will be required; and means for causing STEP execution of code instructions upon switching to the new domain.

5. The system of claim 4, wherein said generating commands means includes means for determining the current domain;

means responsive to the determining means for performing a STEP command using said simulator if the Y domain is the current domain and no cross-domain execution switch is required and for performing the STEP command using said X hardware if the X domain is the current domain and no domain switch is required.

6. The system of claim 5 further comprising an environment manager operating in said X domain for receiving said STEP command and exercising supervisory control over said simulator for performing said STEP command.

7. The system of claim 4, wherein said generating commands means includes:

means for determining the current domain; and means, responsive to the determining means, for performing a RUN command using said simulator if the Y domain is the current domain and for performing the RUN command using said X hardware if the X domain is the current domain.

8. The system of claim 1, wherein said generating commands means includes means for generating domain dependent support commands for memory access and breakpoint processing.

9. The system of claim 8, wherein said means for generating domain dependent support commands generates memory access commands including examine and deposit commands for respectively examining and writing to memory addresses.

10. The system of claim 9, wherein said generating commands means includes means for determining a current domain in which code is executing; and said performing means includes means, responsive to the determining means, for performing an address read or write command using said simulator if a target address of said read or write command is in the Y domain and to the X architecture for direct execution if the target address of said read or write command is in the X domain.

11. The system of claim 8, wherein said means for generating domain dependent support commands includes means for setting and cancelling a breakpoint.

12. The system of claim 11, wherein the generating commands means further includes means for generating a breakpoint table and means for adding breakpoints to said table and cancelling breakpoints from said table.

13. The system of claim 11, further comprising means for determining an execution domain of a target breakpoint address; and wherein said generating commands means includes means for generating a breakpoint address processing command for application to said simulator; and means for generating a breakpoint address processing command for direct execution by said X hardware.

14. A computer system including a first X architecture providing an X domain associated with X code for executing and debugging code associated with both said X domain and a Y domain, the system comprising:

means for receiving calls for debugging code in a selected domain, said selected domain being one of said X domain or said Y domain, said calls being received from said X domain and said Y domain;

a simulator which simulates at least one second Y architecture providing said Y domain associated with Y code, a memory system for storing said X code and said Y code;

means, responsive to the call receiving means, for initiating debugging in said selected domain;

means responsive to the initiating means, for generating setting commands, said setting commands used during execution of said code being debugged and sets one of a plurality of predetermined machine execution states of said computer system in said selected domain; and means, responsive to said initiating means, for generating support commands, said support commands used to support debugging in each of said X and Y domains after debugging has been initiated.

15. The system of claim 14, wherein said plurality of predetermined machine execution states includes a STEP state in which code execution is stepwise, and a RUN state in which code execution is continuous.

16. The system of claim 14, wherein said computer system includes a simulator for emulating Y hardware embodying said second simulated Y architecture, and wherein said simulator comprises X code executing on said X hardware in the X domain.

17. The system of claim 16, wherein said means for generating setting commands includes:

means for detecting whether an instruction will require a cross-domain execution switch from a current domain to a new domain;

means for setting a breakpoint at an address of a first instruction to be executed in the new domain if a cross-domain execution switch will be required; and means for causing STEP execution of instructions upon switching to the new domain.

18. The system of claim 17 further comprising:

means for determining the current domain in which code is executing;

means, responsive to the determining means, for generating a STEP command that is used with said simulator if the Y domain is the current domain and no cross-domain execution switch is required; and means for generating the STEP command for use with the X hardware if the X domain is the current domain and no cross-domain execution switch is required.

19. The system of claim 16, wherein said means for generating setting commands includes:

means for generating a RUN command for use with said simulator for code execution in the Y domain; and means for generating a RUN command for use with said X hardware for code execution in the X domain.

20. The system of claim 16, wherein said second support command generating means includes means for generating memory access commands and breakpoint processing commands.

21. The system of claim 20, wherein said means for generating support commands includes means for generating an address read or write command for processing by said simulator if a target address of said read or write command is in the Y domain and for generating an address read or write command for executing by said X hardware if a target address is in the X domain.

22. A method of executing and debugging code in a computer system, the method comprising the steps of:

executing X code in an X domain and Y code in a Y domain, said computer system including a first X architecture providing said X domain associated with X code, a simulator which simulates at least one second Y architecture providing said Y domain associated with Y code, and a memory system for storing said X code and said Y code;

receiving calls from code executing in said X domain and said Y domain, said calls being issued during debugging of said code executing in a selected domain, said selected domain being one of said X or said Y domains;

initiating, in response to receiving one of said calls, debugging of said code in said selected domain;

generating commands for controlling said debugging of said code in said selected domain; and performing the commands in the computer system for controlling debugging.

23. The method of claim 22, wherein said generating comprises generating commands which control a machine execution state of the computer system in the selected domain.

24. The method of claim 23, wherein said machine execution state comprises a STEP state in which code execution is stepwise and a RUN state in which code execution is continuous.

25. The method of claim 24, wherein said generating commands step further includes:

detecting whether a code instruction will require a cross-domain execution switch from a current domain to a new domain;

setting a breakpoint at an address of a first instruction to be executed in the new domain if a cross-domain execution switch will be required; and causing STEP execution of code instructions upon switching to the new domain.

26. The method of claim 25, wherein said computer system includes a simulator operating on the X hardware in the X domain for said second simulated Y architecture, and wherein the method further comprises the steps of:

determining the current domain;

performing a STEP command using said simulator if the Y domain is the current domain and no cross-domain execution switch is required; and performing a STEP command using the X hardware if the X domain is the current domain and no cross-domain execution switch is required.

27. The method of claim 25, wherein said computer system includes a simulator operating on the X hardware in the X domain for simulated said second Y architecture, and wherein the method further comprises the steps of:

determining the current domain;

performing a RUN command using the simulator if the Y domain is the current domain; and performing a RUN command using the X hardware if the X domain is the current domain.

28. The method of claim 22, wherein said step of generating commands comprises generating domain dependent support commands including memory access commands and commands for setting and cancelling breakpoints, and wherein said step of performing the commands includes performing said domain dependent support commands differently in the X and Y domains to control debugging.

29. The method of claim 28, wherein said step of generating commands further comprises creating a breakpoint table, and adding and removing breakpoints from said table in response to said setting and cancelling commands.

30. The method of claim 29 further comprising switching code execution between the X domain and the Y domain in response to breakpoints, and halting code execution upon said switching domains to permit user interaction.

31. A method of executing and debugging code in a computer system, the method comprising the steps of:

executing X code in an X domain and Y code in a Y domain, said computer system including a first X architecture providing said X domain associated with X code, a simulator which simulates at least one second Y architecture providing said Y domain associated with Y code, and a memory system for storing said X code and said Y code;

receiving calls from code executing in said X domain and said Y domain, said calls being issued during debugging of said code executing in a selected domain, said selected domain being one of said X or said Y domains;

initiating, in response to receiving one of said calls debugging of said code in said selected domain;

setting a machine execution state in the selected domain, said machine execution state being one of a predetermined set of states comprising a STEP state in which code is executed stepwise, and a RUN in which code execution is continuous; and controlling the computer system to support debugging in each of said X and Y domains.

32. The method of claim 31 further comprising the steps of:

detecting whether a code instruction requires a cross-domain execution switch from a current domain to a new domain;

setting a breakpoint at an address of an instruction to be executed in the new domain if a cross-domain execution switch is required; and causing STEP execution of code upon switching to the new domain.

33. The method of claim 32 further comprising the steps of:

determining the current domain;

causing code execution to be halted after executing each instruction if the current domain is either the Y domain or the X domain and no cross-domain execution switch is required.

* * * * *